United States Patent Office 3,348,675
Patented Oct. 24, 1967

3,348,675
SINK-FLOAT SEPARATION PROCESS
Elmer C. Tveter, Concord, Calif., assignor to The Dow Chemical Company, Midland, Mich., a corporation of Delaware
No Drawing. Filed Dec. 30, 1963, Ser. No. 334,563
2 Claims. (Cl. 209—5)

ABSTRACT OF THE DISCLOSURE

This invention concerns an improved sink-float process for separating finely divided dry solid materials consisting of at least two components of different densities which comprises employing as a parting liquid at least one halogenated hydrocarbon compound or mixture of compounds, and adding sufficient soluble ionic dispersant to the parting liquid to substantially minimize, if not prevent, the formation of floc during said sink-float process.

---

The present invention relates to an improved process for the separation of mixtures of finely divided solid materials having different densities, and more particularly to an improved process for separating materials by means of a parting liquid having a density intermediate those of the materials to be separated.

Separation of material of different densities by sink-float means is well known. One of the problems encountered in sink-float separations is that of floc formation by the finely divided particles. Many materials such as sylvite, halite, or clays, when finely divided, tend to readily form flocs when known sink-float methods are employed. Floc-formation tends to interfere with separation, thereby reducing the yield of the process.

It is an object of the present invention to provide an improved sink-float process whereby floc-formation is minimized or eliminated, thus improving the process yield.

Other objects and advantages of the present invention will become apparent in the course of the following specification.

In accordance with the present invention the desired improvement is obtained by employing as the parting liquid at least one halogenated hydrocarbon compound or mixture of compounds having a maximum viscosity at the process temperature of about 5 centipoise, water present in the process in the maximum amount of 2 percent by weight of the solid material, and adding sufficient soluble ionic dispersant to the parting liquid to substantially prevent the formation of floc during the sink-float process. In order to obtain a parting liquid having the desired specific gravity, two or more appropriate miscible, halogenated hydrocarbon compounds may be mixed together.

In the present specification, the term "dispersion" is meant to be synonymous with substantial prevention of floc-formation.

Dispersant is usually added to the parting liquid in an amount sufficient to provie the desired dispersion. Generally, an amount of dispersant of from about 0.005 to about 1.0 percent by weight of parting liquid is desirable, with from about 0.005 to about 0.10 percent being preferred.

In some situations, drying of the solid material may be required in order to reduce the total amount of water present in the process at any given time to 2 percent or less by weight of the solid materials. When more water is present, floc-formation becomes a significant problem, even when a dispersant is employed.

Preferred liquid compounds for use as parting liquids in the process of the present invention are the halogenated hydrocarbons, and mixtures thereof, which contain from 1 to 2 carbon atoms, and from 2 to 6 halogen atoms. Representative examples of such halogented hydrocarbons useful in the present process are: methylene bromide; methylene chlorobromide; dibromo chloro methane; tribromo fluoro methane; bromo trichloro methane; bromo iodo methane; dibromo dichloro methane; bromo dichloro methane; 1,2-dibromo ethane; 1,1,2,2,-tetrafluoro 1,2-diiodo ethane; 1,1-dibromo 2,2-difluoro ethane; 1,2-dibromo 1,1,2-trichloro ethane; 1,2-dibromo 2-chloro 1,1,2-trifluoro ethane; 1,2-dibromo 1-chloro 2,2-difluoro ethane; 2,2-dibromo 1,1,1-trifluoro ethane; 1,2-dibromo 1-chloro 2,2-difluoro ethane; 2,2-dibromo 1,1,1-trifluoro ethane; 1,2-dibromo 1,1-difluoro ethane; 1-chloro 1,1,2-trifluoro 2-iodo ethane; 1,1-dibromo tetrafluoro ethane; 1,2-dibromo tetrafluoro ethane; and the like, and mixtures thereof. Water may be present in the process in an amount not in excess of 2 percent by weight of the solid materials.

Dispersants suitable for use in the present invention may be generally defined as ionic surfactants soluble in the selected organic parting liquid.

More specifically, dispersants suitable for use in the present invention may be defined as those which are soluble in the selected organic parting liquid and are selected from the group consisting of (A) petroleum sulfonates, (B) cationic amine surface active agents containing up to 20 carbon atoms and having at least one uninterrupted alkyl group containing at least 8 carbon atoms, (C) anionic sulfonate and sulfate-containing surface active agents having at least one uninterrupted alkyl chain containing from 8 to 18 carbon atoms, (D) mono- and dialkyl esters of phosphoric acid, the monoalkyl esters containing from 4 to 20 carbon atoms and the dialkyl esters containing from 8 to 12 carbon atoms, and (E) stearate esters and divalent stearate salts.

Examples of suitable ionic dispersants for use in the present process are: Arquad 2HT-75, dimethyl distearyl quaternary ammonium chloride; Arquad C–50; Armeed DM–16D, dimethylhexyldecyl amine; sulfonated castor oil; sorbitan monostearate; Solar Emulsifier F–221, a fatty acid amide; Diglycol Oleate S; Armeen 8D, octyl amine; polyoxyethylene sorbitol esters of fatty and resin acids; Diglycol Stearate S; Petronate CR, a refined petroleum sulfonate containing about 62 percent by weight of sodium alkyl aryl sulfonates having the general formula $C_nH_{(2n-10)}SO_3Na$, wherein $n$ is an integer from about 25 to about 35; Parnol 85, sodium lauryl benzene sulfonate; Morpel X–803, synthetic petroleum sulfonate having a molecular weight of about 320; Igepon T77, sodium N-methyl-N-oleoyltaurate; Alconate 80, refined petroleum sulfonate having a molecular weight of from about 415 to about 430; Nekal BX–78, sodium alkyl naphthalene sulfonate; Benax 6A1, sodium salt of dodecyl phenoxy chlorobenzene sulfonic acid; Benax 2A1, sodium salt of diphenyl oxide disulfonic acid; magnesium stearate; calcium salt of stearic acid; Igepon AC–78, coconut oil acid ester of sodium isothionate; octa decylamine; stearyl acid phosphate; 2 ethyl butanol acid phosphate; capryl acid phosphate; and dibutyl phosphate.

Solid materials which may be treated by the present process are those which contain at least two components of different densities and are substantially non-reactive with either the parting liquid or the dispersant. In general, any material which may be separated by ordinary sink-float methods may be separated by the present process. The present process is particularly adapted, however, to the separation of finely divided materials which may tend to form flocs in non-aqueous media.

A better understanding of the present invention may be obtained in light of the following examples which are set forth to illustrate, and are not to be construed to limit, the present invention.

Example 1

A complex, high clay, New Mexico potash ore containing about 0.8 weight percent water was ground to pass a 65 mesh (U.S. Standard Sieve Size) screen. A portion of the ground ore (fines) was treated by sing-float technique in a centrifuge, employing as the parting liquid a mixture of methylene chlorobromide and methylene bromide having a specific gravity of 2.05. About 73 weight percent of the KCl in the treated ore was recovered as float product.

Another portion of the previously ground ore was treated in substantially the same manner except that 0.01 percent by weight of dispersant (octadecylamine) was added to the parting liquid. About 86 weight percent of the KCl in the treated ore was recovered as float product.

Pertinent data are tabulated as follows:

| Dispersant Added | Wt. Percent of Fines in— | | Wt. Percent KCl Content of— | | Wt. Percent of KCl in Fines recovered (as float) |
|---|---|---|---|---|---|
| | Float | Sink | Float | Sink | |
| None | 20.9 | 79.1 | 90.6 | 8.7 | 73.4 |
| 0.01 Wt. Percent | 25.2 | 74.8 | 90.4 | 4.9 | 86.0 |

When the above procedures were repeated on further portions of the above-mentioned ground potash ore (fines) but without centrifuging, about 17.7 percent by weight of the fines was recoverable as float (containing about 90 percent KCl) in the system containing the dispersant (0.01 percent by weight of parting liquid), whereas only about 1 percent by weight of the fines was recoverable from the system which did not contain dispersant.

Portions of the ground potash ore (fines) were dried for 24 hours at 110 degrees centigrade. Dry parting liquid (a mixture of methylene chlorobromide and methylene bromide) alone and dry parting liquid containing 0.01 weight percent dispersant (octadecylamine) were employed in static sink-float tests. Pertinent data are tabulated as follows:

| Dispersant Added | Wt. Percent Fines Floated | Wt. Percent KCl in Float | Wt. Percent KCl in Fines Recovered |
|---|---|---|---|
| None | 12.9 | 88.9 | 42.8 |
| 0.01 Wt. Percent | 26.2 | 82.0 | 74.6 |

Example 2

A sample of high clay New Mexico potash ore having a moisture content of 0.8 percent by weight was ground to all −65 mesh fines as in Example 1. Identical portions of these fines were sink-float separated employing as the parting liquid a mixture of methylene bromide and perchloroethylene having a specific gravity of 2.05. The separations were made after centrifuging for one minute.

| Dispersant | | Wt. Percent Fines Floated | Wt. Percent KCl in Float | Wt. Percent KCl in Fines Recovered |
|---|---|---|---|---|
| Material | Wt. Percent | | | |
| None | | 20.9 | 96.0 | 73.6 |
| Do | | 20.7 | 96.6 | 71.4 |
| Petronate CR | 0.01 | 26.0 | 95.8 | 89.4 |
| Capryl acid phosphate | 0.01 | 24.8 | 95.7 | 85.9 |
| Parnol 85 | 0.01 | 24.0 | 95.5 | 82.3 |
| Benax 6Al | 0.01 | 24.1 | 95.9 | 84.3 |

Example 3

A sample of California low grade phosphate ore was ground to pass a 48 mesh (U.S. Standard Sieve Size) screen and dried overnight at 105 degrees centigrade. A 20 gram sample of ground ore (fines) was placed in each of two 125 ml. separatory funnels together with 100 ml. of parting liquid. In Test A the parting liquid was tribromofluoromethane alone, while in Test B, 0.01 percent by weight of Petronate CR (sodium petroleum sulfonate) was added to the parting liquid as a dispersant. The funnels were shaken and allowed to settle for ½ hour, after which time the sink and float fractions were separated and analyzed as follows:

| | Wt. Percent | Percent P₂O₅ | Distribution, Percent P₂O₅ |
|---|---|---|---|
| Test A—Without dispersant: | | | |
| Sink | 24.75 | 28.1 | 75.7 |
| Float | 75.25 | 2.97 | 24.3 |
| Head, Calc | 100.00 | 9.19 | 100.0 |
| Test B—With dispersant: | | | |
| Sink | 23.60 | 30.3 | 80.3 |
| Float | 76.40 | 3.32 | 19.7 |
| Head, Calc | 100.00 | 8.91 | 100.0 |

Example 4

A sample of −65 mesh crude anthracite coal was slurried with pentachloroethane (sp. gr. 1.67) in a separatory funnel. The sink fraction was removed and reseparated in a second separatory funnel with pentachloroethane to produce a final sink product and a middling float product. The float fraction from the first separatory funnel (concentrate) was not recleaned. The results as shown below demonstrate that the flocs formed between the coal and non-combustible mineral content (refined to hereinafter is "ash") are not broken down during the cleaning and about 40 percent of the coal is discharged with the waste sink product.

| Pentachloroethane Alone | Wt. Percent | Percent Ash | Distribution, Percent | |
|---|---|---|---|---|
| | | | Coal | Ash |
| Primary Float | 30.15 | 5.71 | 56.7 | 3.4 |
| Middlings | 1.51 | 6.79 | 2.8 | 0.2 |
| Sink (waste) | 68.34 | 70.30 | 40.5 | 0.2 |
| Heads Calc | 100.00 | 49.87 | 100.0 | 100.0 |

The same procedures was followed using a 0.01 percent solution of Petronate CR in pentachloroethane as the parting liquid.

| Pentachloroethane with Petronate CR | Wt. Percent | Percent Ash | Distribution, Percent | |
|---|---|---|---|---|
| | | | Coal | Ash |
| Primary Float | 45.09 | 11.5 | 78.3 | 10.6 |
| Middlings | 11.28 | 53.7 | 10.2 | 12.3 |
| Sink (waste) | 43.63 | 86.6 | 11.5 | 77.2 |
| Heads Calc | 100.00 | 49.03 | 100.0 | 100.0 |

These results show the improved recovery of the coal in the float product and rejection of the ash in the waste or sink product.

Example 5

Following the procedure of Example 4, but employing perchloroethylene as the parting liquid, the following data were obtained:

| Perchloroethylene | Wt. Percent | Percent Ash | Distribution, Percent | |
|---|---|---|---|---|
| | | | Coal | Ash |
| Primary Float | 23.38 | 4.46 | 45.2 | 2.1 |
| Middlings | 1.49 | 5.06 | 2.9 | 0.1 |
| Sink (waste) | 75.13 | 65.8 | 51.9 | 97.8 |
| Head, Calc | 100.00 | 50.54 | 100.0 | 100.0 |

| Perchloroethylene containing 0.01 wt. Percent Petronate CR | Wt. Percent | Percent Ash | Distribution, Percent | |
|---|---|---|---|---|
| | | | Coal | Ash |
| Primary Float | 40.68 | 6.37 | 74.5 | 5.30 |
| Middlings | 9.31 | 50.0 | 9.1 | 9.5 |
| Sink (waste) | 50.01 | 83.3 | 16.4 | 85.2 |
| Head, Calc | 100.00 | 48.88 | 100.0 | 100.0 |

Example 6

Tests were run with typical Borax ores, i.e., tincal, razorite, ulexite, and colemanite, to determine the effect of dispersant addition in sink-float separation. Parting liquids employed in the tests were mixtures of methylene bromide and methylene chlorobromide, methylene bromide and perchloroethylene, and acetylene tetrabromide and perchloroethylene. Each parting liquid mixture had a specific gravity of 2.2.

In each case, with each ore in each different parting liquid, markedly improved dispersion of the ore was obtained in the parting liquid to which had been added 0.01 weight percent of Petronate CR (sodium petroleum sulfonate).

Various modifications may be made in the present invention without departing from the spirit or scope thereof, and it is to be understood that I limit myself only as defined in the appended claims.

I claim:

1. In a sink-float separation process, wherein finely divided solid materials of a size which tends to form flocs in non-aqueous media and which contains at least two components of different densities are separated by employing a parting liquid of intermediate density substantially non-reactive with said solid material, said parting liquid having a maximum viscosity of about 5 centipoises at process temperature and consisting essentially of at least one halogenated hydrocarbon containing inclusively from one to two carbon atoms and from 2 to 6 halogen atoms, water being present in the process in a maximum amount of 2 percent by weight of the solid material; the improvement which comprises providing an ionic dispersant which is substantially unreactive with said solid material and said parting liquid and which is soluble in said parting liquid, selected from the group consisting of (A) petroleum sulfonates, (B) cationic amine surface active agents containing up to 20 carbon atoms and having at least one uninterrupted alkyl group containing at least 8 carbon atoms, (C) anionic sulfonate and sulfate-containing surface active agents having at least one uninterrupted alkyl chain containing from 8 to 18 carbon atoms, (D) mono- and dialkyl esters of phosphoric acid, the monoalkyl esters containing from 4 to 20 carbon atoms and the dialkyl esters containing from 8 to 12 carbon atoms, and (E) stearate esters and divalent stearate salts, and adding from about 0.005 to about 1.0 percent by weight of said dispersant to said parting liquid.

2. The method of claim 1 wherein the dispersant is added in an amount of from about 0.005 to about 0.10 percent to said parting liquid.

References Cited
UNITED STATES PATENTS

| | | | |
|---|---|---|---|
| 2,150,917 | 3/1939 | Foulke | 209—172 |
| 2,165,607 | 7/1939 | Blow | 209—172 |
| 2,274,521 | 2/1942 | Berry | 209—5 |
| 2,899,392 | 8/1959 | Schranz | 209—172.5 X |
| 3,098,035 | 11/1963 | Aplan | 209—5 |

FRANK W. LUTTER, *Primary Examiner.*